US010545670B2

(12) United States Patent
Arcangeli et al.

(10) Patent No.: US 10,545,670 B2
(45) Date of Patent: Jan. 28, 2020

(54) SCALABLE PAGE MIGRATION AFTER MEMORY DE-DUPLICATION

(71) Applicant: Red Hat Israel, Ltd., Ra'anana (IL)

(72) Inventors: Andrea Arcangeli, Imola (IT); Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 15/054,971

(22) Filed: Feb. 26, 2016

(65) Prior Publication Data
US 2017/0249090 A1  Aug. 31, 2017

(51) Int. Cl.
*G06F 3/06* (2006.01)
*G06F 9/455* (2018.01)

(52) U.S. Cl.
CPC .......... *G06F 3/0608* (2013.01); *G06F 3/0673* (2013.01); *G06F 9/45558* (2013.01); *G06F 2009/45583* (2013.01)

(58) Field of Classification Search
CPC .... G06F 3/0608; G06F 3/0604; G06F 3/0652; G06F 3/0673; G06F 9/45558; G06F 2009/45583
See application file for complete search history.

(56) References Cited

U.S. PATENT DOCUMENTS

| 5,778,430 | A | * | 7/1998 | Ish | G06F 12/123 711/113 |
|---|---|---|---|---|---|
| 8,086,799 | B2 | | 12/2011 | Mondal et al. | |
| 8,190,827 | B2 | | 5/2012 | Eidus et al. | |
| 8,688,652 | B2 | | 4/2014 | Baldwin et al. | |
| 8,725,956 | B2 | | 5/2014 | Eidus et al. | |
| 8,751,763 | B1 | | 6/2014 | Ramarao | |
| 8,935,506 | B1 | | 1/2015 | Gopalan | |
| 8,996,800 | B2 | | 3/2015 | Venkatesh et al. | |
| 2010/0030998 | A1 | * | 2/2010 | Kiriansky | G06F 12/10 711/206 |

(Continued)

OTHER PUBLICATIONS

Arcangeli, A., Eidus, I., and C. Wright, "Increasing memory density by using KSM," Proceedings of the Linux Symposium, 2009, pp. 19-28.*

(Continued)

*Primary Examiner* — Tracy A Warren
(74) *Attorney, Agent, or Firm* — K&L Gates LLP

(57) ABSTRACT

A system and method of de-duplication includes receiving a first page, scanning a first structure, identifying a first match, determining a quantity of mappings to the first match is less than a threshold, and adding a first mapping to the first match. The method includes receiving a second page, scanning the first structure, identifying the first match, determining the quantity of mappings to the first match meets the threshold, and storing the second page in a second structure. The method includes receiving a third page, scanning the first structure, identifying the first match, determining the quantity of mappings to the first match meets the threshold, scanning the second structure, identifying the second page as the match, and creating a third structure that replaces the first match and includes an identifier node, the first match, and a second match with the second and third mapping identifying the second and third pages.

20 Claims, 6 Drawing Sheets

(56) References Cited

U.S. PATENT DOCUMENTS

2013/0073823 A1* 3/2013 Hunter ............... G06F 9/45533
                                                    711/162
2013/0159596 A1   6/2013 Van De Ven et al.
2015/0052323 A1   2/2015 Noel et al.
2015/0324236 A1  11/2015 Gopalan et al.
2017/0060898 A1*  3/2017 Lu .................... G06F 17/30327

OTHER PUBLICATIONS

Chiang et al., "Conference Paper Introspection-based memory de-duplication and migration," DOI: 10.1145/2451512.2451525 Conference Proceedings of the 9th ACM SIGPLAN/SIGOPS International conference on Virtual execution environments, vol. 48, publication date unknown, [retrieved from the Internet <URL: http://www.researchgate.net/publication/262291602 _Introspection-based_memory_de-duplication_and_migration> on Nov. 25, 2015].

Dong et al., "Tradeoffs in Scalable Data Routing for Deduplication Clusters," publication date unknown, 15 pages.

Sharma et al., "Singleton: System-wide Page Deduplication in Virtual Environments," Department of Computer Science & Engineering, Indian Institute of Technology Bombay, publication date unknown, 12 pages.

* cited by examiner

US 10,545,670 B2

SCALABLE PAGE MIGRATION AFTER MEMORY DE-DUPLICATION

BACKGROUND

The present disclosure relates generally to memory management of virtual machines and operative systems run as either hosts or guests and, more particularly, to scalable page migration after memory de-duplication. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides new and innovative methods and systems for memory de-duplication. In an example embodiment, the method includes receiving a first single memory page, and scanning a plurality of candidate memory pages of a first data structure. The first data structure includes a plurality of nodes including at least a first node and a second node. Each of the first node and the second node point to a first candidate memory page and a second candidate memory page respectively. The method further includes identifying a first matched memory page as a match to the first single memory page. The first matched memory page is one of the plurality of candidate memory pages that matches the first single memory page. The method further includes determining that a quantity of memory page mappings to the first matched memory page is less than a threshold, and, responsive to determining that the quantity of memory page mappings to the first matched memory page is less than the threshold, adding a first mapping (e.g., a first new mapping) to the first matched memory page, the first mapping identifying the first single memory page.

In an example embodiment, the method further includes receiving a second single memory page, scanning the plurality of candidate memory pages of the first data structure, identifying the first matched memory page as a match to the second single memory page, and determining that the quantity of memory page mappings to the first matched memory page meets the threshold. The method further includes, responsive to determining that the quantity of memory page mappings to the first matched memory page meets the threshold, scanning a second data structure for the match to the second single memory page, determining that the second data structure lacks the match to the second single memory page, and, responsive to determining that the second data structure lacks the match to the second single memory page, storing the second single memory page in the second data structure.

In an example embodiment, the method further includes receiving a third single memory page, scanning the plurality of candidate memory pages of the first data structure, identifying the first matched memory page as a match to the third single memory page, and determining that the quantity of memory page mappings to the first matched memory page meets the threshold. The method further includes, responsive to determining that the quantity of memory page mappings to the first matched memory page meets the threshold, scanning the second data structure for the match to the third single memory page, identifying the second single memory page as the match to the third single memory page, and, responsive to identifying the second single memory page as the match to the third single memory page, creating a third data structure. The third data structure replaces the first matched memory page, and creating the third data structure includes creating an identifier node (e.g., a new identifier node) that replaces the node in the first data structure that was attached to the first matched memory page, the identifier node identifying content of each matched memory page in the third data structure, attaching the first matched memory page to the identifier node, and attaching a second matched memory page to the first matched memory page, including adding a second mapping to the second matched memory page, the second mapping identifying the second single memory page, and adding a third mapping to the second matched memory page, the third mapping identifying the third single memory page.

Additional features and advantages of the disclosed methods and system are described in, and will be apparent from, the following Detailed Description and the Figures.

DETAILED DESCRIPTION OF EXAMPLE EMBODIMENTS

Figure 1:
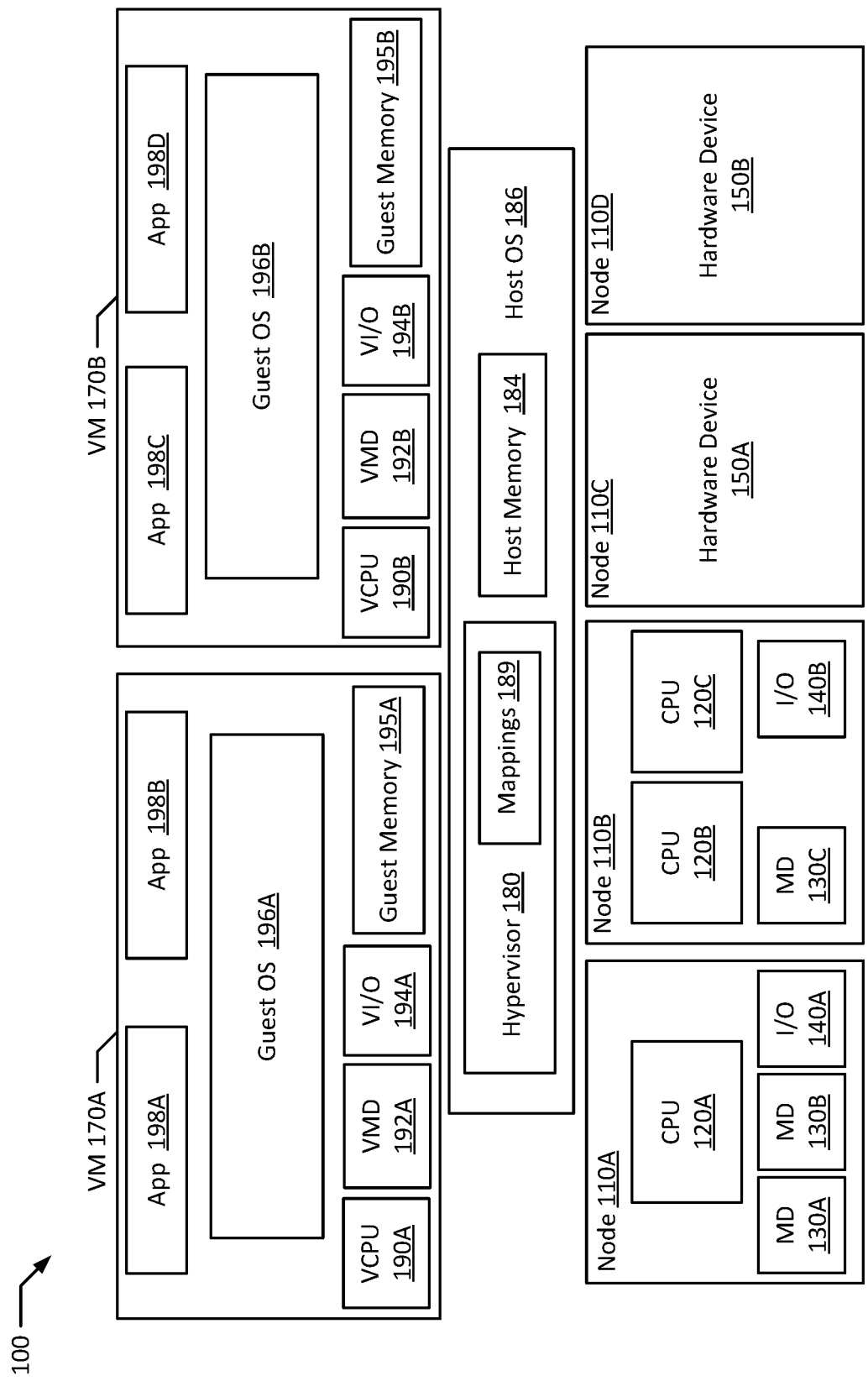
FIG. 1 is a block diagram of an example multi-processor computer system according to an example embodiment of the present disclosure.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors 120A-C refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, input/output device 140A-B refers to a device capable of providing an interface between one or more processors and an external device. The external device's operation is based on the processor inputting and/or outputting data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A, may be provided by one or more local buses of suitable architecture, for example, peripheral component interconnect (PCI). As used herein, a device of the host operating system (host OS) 186 (or host device) may refer to CPU 120A-C, MD 130A-C, I/O 140A-B, a software device, and/or hardware device 150A-B.

As noted above, computer system 100 may run multiple guest virtual machines (e.g., VM 170A-B), by executing a software layer (e.g., hypervisor 180) above the hardware and below the guest virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the host operating system 186, or may run directly on the computer system 100 without an operating system beneath it. The hypervisor 180 may virtualize the physical layer, including processors, memory, and I/O devices, and present this virtualization to guest virtual machines 170A-B as devices, including virtual processors (e.g., VCPU 190A-B), virtual memory devices (e.g., VMD 192A-B), and/or virtual I/O devices (e.g., VI/O 194A-B). A virtual machine may run on any type of dependent, independent, compatible, and/or incompatible applications on the underlying hardware and OS. In an example embodiment, applications run on a virtual machine may be dependent on the underlying hardware and/or OS. In another example embodiment, applications run on a virtual machine may be independent of the underlying hardware and/or OS. For example, applications run on a first virtual machine may be dependent on the underlying hardware and/or OS while applications run on a second virtual machine are independent of the underlying hardware and/or OS. Additionally, applications run on a virtual machine may be compatible with the underlying hardware and/or OS. In an example embodiment, applications run on a virtual machine may be incompatible with the underlying hardware and/or OS. For example, applications run on one virtual machine may be compatible with the underlying hardware and/or OS while applications run on another virtual machine are incompatible with the underlying hardware and/or OS. In an example embodiment, a device may be implemented as a virtual machine.

In an example embodiment, a guest virtual machine 170A-B may execute a guest operating system (guest OS) 196A-B which may utilize the underlying VCPU 190A-B, VMD 192A-B, and VI/O devices 194A-B. One or more applications 198A-D may be running on a guest virtual machine 170A-B, on the guest operating system 196A-B. In an example embodiment, a guest virtual machine 170A-B may include multiple virtual processors 190A-B. Processor virtualization may be implemented by the hypervisor 180 scheduling time slots on one or more physical processors 120A-C such that from the guest operating system's perspective those time slots are scheduled on a virtual processor 190A-B.

The hypervisor 180 controls and limits access to memory (e.g., memory allocated to the guest virtual machines 170A-B and memory allocated to the guest operating systems 196A-B, such as guest memory 195A-B provided to guest operating systems 196A-B, etc.). For example, guest memory 195A-B may be divided into a plurality of memory pages. Access to these memory pages is controlled and limited by the hypervisor 180. Likewise, for example, guest memory 195A-B allocated to the guest operating system 196A-B is mapped to host memory 184 such that when a guest application 198A-D uses or accesses a memory page of guest memory 195A-B it is actually using or accessing host memory 184. Maps to various memory locations may be stored, by the hypervisor 180, in mappings 189.

Mappings 189 may be used together with any paging data structure used by the guest virtual machines 170A-B to support translation from guest operating system 196A-B to host operating system 186 (e.g., 64-bit linear address space using a four-level hierarchical paging structure, Physical Address Extension mode, INTEL® Extended Memory 64 Technology mode, etc.).

Mappings 189 may additionally be utilized, by the hypervisor 180 (e.g., RHEV-H), to structure memory in a number of particular ways. In example embodiments, mappings 189 may be utilized by host OS 186 (e.g., RHEL) and/or guest OS 196A-B to structure memory in a number of particular ways. For example, memory can be tracked and structured using a number of different data structures (e.g., a first data structure, a second data structure, and a third data structure). Mappings of memory (e.g., host memory 184 and/or guest memory 195A-B) in the hierarchical paging structure may be altered through computations on the data structures that are tracking the memory, to achieve memory de-duplication. For example, the hypervisor 180 may identify two memory pages that match one another, and update mappings 189 with respect to the two memory pages, such that the duplicate page is no longer required to be physically stored in memory. In this way, memory is de-duplicated. The specific process of memory de-duplication, including the data structures used to implement memory de-duplication, are discussed in greater detail below with reference to FIGS. 2-5B.

Figure 2:
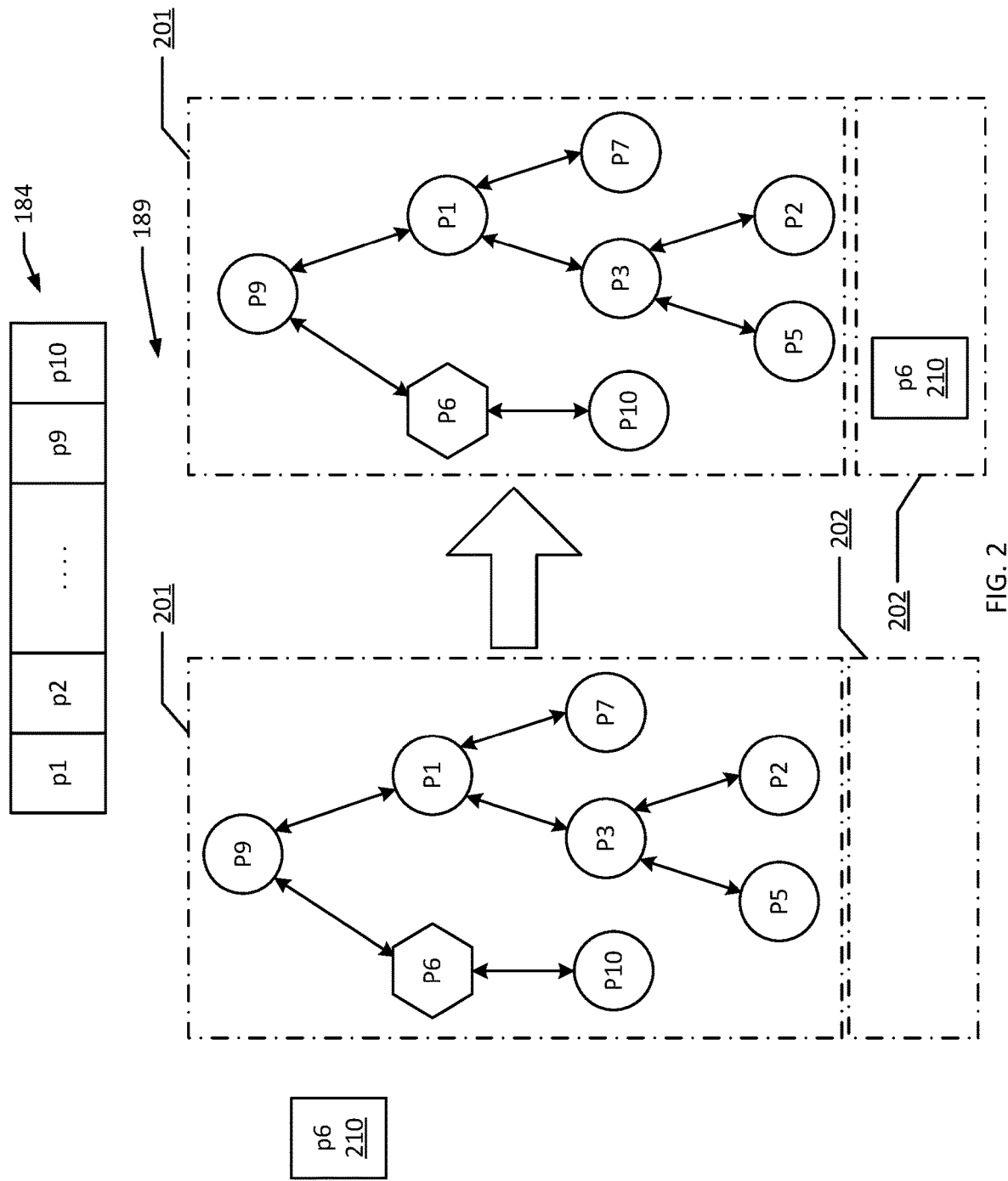
FIG. 2 is a system diagram illustrating memory de-duplication with a first data structure and a second data structure according to an example embodiment of the present disclosure.

FIG. 2 is a system diagram illustrating memory de-duplication with a first data structure and a second data structure according to an example embodiment of the present disclosure. Mappings 189 include the first data structure 201 and the second data structure 202. In an example embodiment, the first data structure 201 is a red black tree. Likewise, in an example embodiment, the second data structure 202 is a red black tree.

As illustrated, the first data structure 201 includes a plurality of nodes (e.g., P1, P2, P3, P5, P6, P7, P9, and P10), which are visually depicted as circles or hexagons. Likewise, each of the plurality of nodes is attached to a respective candidate memory page (e.g., p1, p2, p3, p5, p6, p7, p9, and p10). Nodes may be referred to as identifier nodes. Single memory pages and candidate memory pages are visually depicted as rectangles. For example, node P6 may point to (e.g., indicate, refer to, or be attached to) a candidate memory page p6, stored in memory (e.g., host memory 184). As illustrated in FIG. 2, candidate memory pages (e.g., p1, p2, p3, p5, p6, p7, p9 and p10) are stored in host memory 184. Node-to-candidate memory page references may be stored, by the hypervisor 180, in mappings 189. In an alternate example embodiment, node-to-node candidate memory page references may be stored by the host OS 186 and/or guest OS 196A-B.

The nodes and respective candidate memory pages may be used for memory de-duplication purposes. For example, as mappings 189 receive memory pages (e.g., a first single memory page), the plurality of candidate memory pages is scanned for a match, and the match may be identified (e.g., the first single memory page has the same content as one of the plurality of candidate memory pages that is represented by one of the plurality of nodes). In an example embodiment, scanning is performed by computer system 100 (e.g., hypervisor 180). For example, the plurality of nodes (e.g., P1, P2, P3, P5, P6, P7, P9, and P10) that point to candidate memory pages (e.g., p1, p2, p3, p5, p6, p7, p9, and p10) is scanned, and P6 is identified as a match to the first single memory page. In other words, the node P6 points to candidate memory page p6 (i.e., the first matched memory page p6), and the first single memory page matches candidate memory page p6. Accordingly, a match is identified. Once the match is identified, a mapping may be added to the first matched memory page p6, identifying the first single memory page.

As referenced above, this process may be generally referred to as memory de-duplication. In other words, both the first single memory page and the candidate memory page p6 (i.e., the first matched memory page p6, represented by node P6) have the same content: they match one another. Instead of storing both pages in memory, a mapping may be added to the first matched memory page p6, identifying the first single memory page. In this way, fewer pages refer to content that is duplicative, thus consuming fewer physical memory resources. In an example embodiment, matched memory pages (e.g., the first matched memory page) are read-only memory pages. In a different example embodiment, matched memory pages (e.g., the first matched memory page) are read-write memory pages.

Additionally, each node may have a threshold, such that there may be a limited quantity of memory page mappings for particular matched memory pages. In an example embodiment, the candidate memory page p6, also referred to as the first matched memory page p6, may be restricted to have no more than 200 memory page mappings. In different example embodiments, the first matched memory page p6 may be restricted to a different threshold (e.g., no more than 25 memory page mappings, no more than 256 memory page mappings, no more than 10,000 memory page mappings, etc.). In an example embodiment, the threshold is a fixed number of internal references that may be changed at runtime. As long as the quantity of memory page mappings to the first matched memory page p6 is less than the threshold (e.g., 199 memory page mappings, when the threshold is 200 memory page mappings), the first data structure 201 operates as described above. Graphically, nodes for matched memory pages with a quantity of memory page mappings less than the threshold are represented by circles (e.g., the quantity of memory page mappings to P9 has not yet met the threshold). However, by comparison, nodes for matched memory pages that have met the threshold are represented by hexagons (e.g., the quantity of memory page mappings to P6 has now met the threshold). Once this threshold is met or if there was no match in the first data structure, additional data structures, such as the second data structure 202, are updated to keep track and index not yet de-duplicated candidate pages.

Continuing on in reference to FIG. 2, while the first data structure 201 has a plurality of nodes (e.g., P1, P2, P3, P5, P6, P7, P9, and P10), initially the second data structure 202 is empty.

As mappings 189 receive additional memory pages, such as a second single memory page 210, the plurality of nodes that point to candidate memory pages is scanned for a match and the match may be identified. In an example embodiment, the plurality of nodes that point to candidate memory pages (e.g., P1, P2, P3, P5, P6, P7, P9, and P10) is scanned, and node P6 is identified as a match to the second single memory page 210. In other words, the node P6 points to candidate memory page p6 (i.e., the first matched memory page p6), and the second single memory page 210 matches candidate memory page p6 (e.g., the second single memory page 210 is also indicated as p6). Accordingly, the match is identified. It must then be determined that the quantity of memory page mappings to the first matched memory page p6 meets the threshold. In this example embodiment, the quantity of memory page mappings to the first matched memory page p6 meets the threshold (e.g., the first matched memory page p6 has 200 memory page mappings). The node P6 for first matched memory page p6 is thus shown graphically as a hexagon.

Responsive to determining that the quantity of memory page mappings to the first matched memory page p6 meets the threshold, the second data structure 202 is scanned for the match to the second single memory page 210. As previously noted, in this example embodiment the second data structure 202 is initially empty. Thus, it is determined that the second data structure 202 lacks the match to the second single memory page 210 (e.g., the match does not exist because the second data structure 202 is empty). Responsive to determining that the second data structure 202 lacks the match to the second single memory page 210, the second single memory page 210 is stored in the second data structure 202. In an alternate example embodiment, a node with a link or mapping to the second single memory page 210 is stored in the second data structure 202. Further interaction between the first data structure 201 and the second data structure 202, and the related third data structure 301, is illustrated by FIG. 3.

Figure 3:
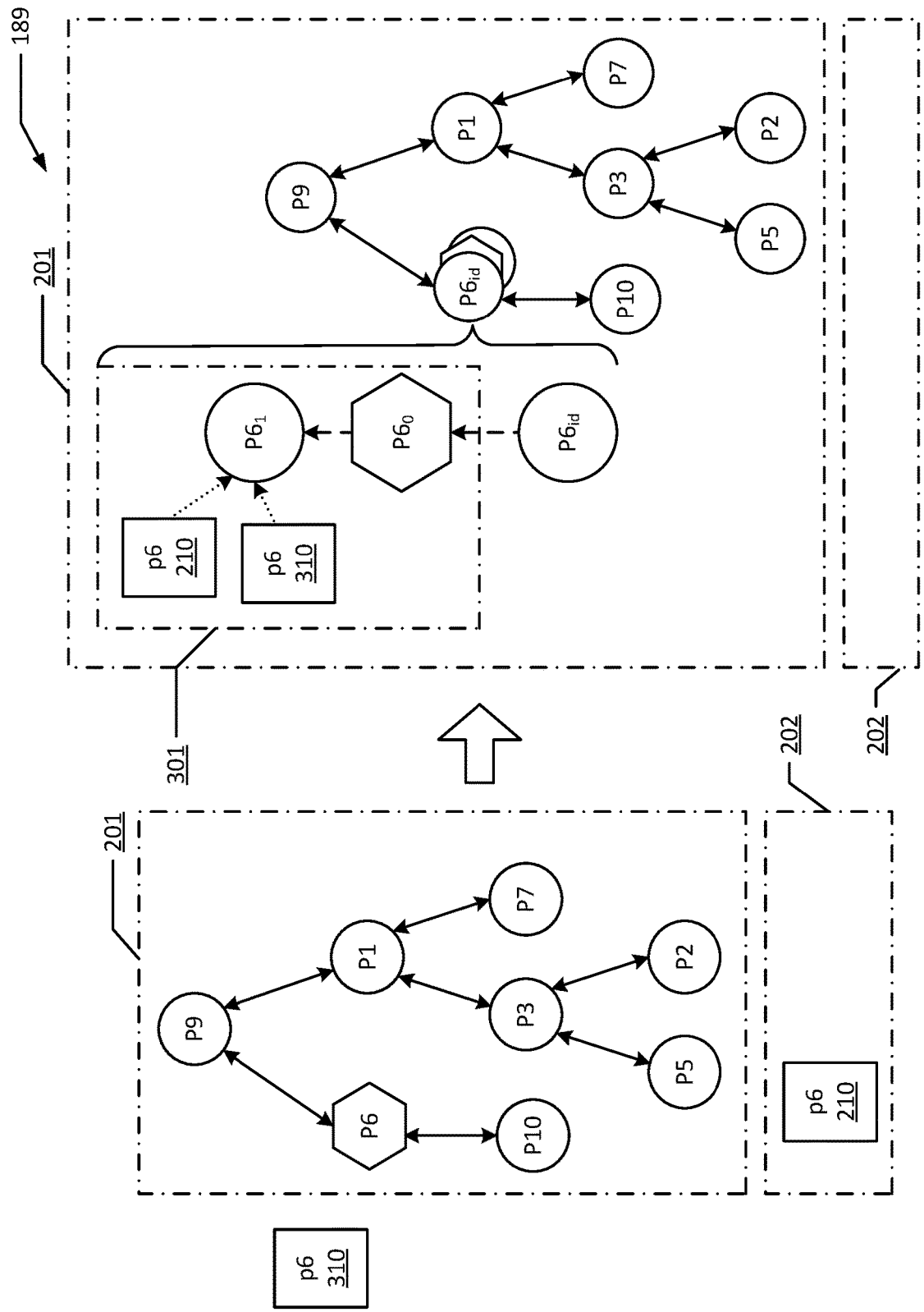
FIG. 3 is a system diagram illustrating memory de-duplication with a first data structure, a second data structure, and a third data structure according to an example embodiment of the present disclosure.

FIG. 3 is a system diagram illustrating memory de-duplication with a first data structure, a second data structure, and a third data structure according to an example embodiment of the present disclosure. Mappings 189 now include the first data structure 201, the second data structure 202, and a third data structure 301. The first data structure 201 includes a plurality of nodes, each of which points to a candidate memory page (e.g., P1, P2, P3, P5, P6, P7, P9, and P10) as described above. The second data structure 202 includes the second single memory page 210, previously stored in the second data structure 202 as described above.

As mappings 189 receive additional memory pages, such as a third single memory page 310, the plurality of nodes that point to candidate memory pages is scanned for a match and the match may be identified. In an example embodiment, the plurality of nodes that point to candidate memory pages (e.g., P1, P2, P3, P5, P6, P7, P9, and P10) is scanned, and node P6 is identified as a match to the third single memory page 310. In other words, the node P6 points to candidate memory page p6 (i.e., the first matched memory page p6), and the third single memory page 310 matches candidate memory page p6 (e.g., the third single memory page 310 is also indicated as p6). Accordingly, the match is identified. It must then be determined that the quantity of memory page mappings to the first matched memory page p6 meets the threshold. In this example embodiment, the quantity of memory page mappings to the first matched memory page p6 meets the threshold (e.g., the first matched memory page p6 has 200 memory page mappings). The node P6 for the first matched memory page p6 is thus shown graphically as a hexagon.

Responsive to determining that the quantity of memory page mappings to the first matched memory page p6 meets the threshold, the second data structure 202 is scanned for the match to the third single memory page 310. The second single memory page 210 is identified as the match to the third single memory page 310. In other words, there are now two single pages (e.g., the second single memory page 210 and the third single memory page 310) that match one another, and both match the first matched memory page p6. However, as previously noted, the quantity of memory page mappings to the first matched memory page p6 meets the threshold. Accordingly, the third data structure 301 is created to replace the node attached to the first matched memory page p6.

More particularly, an identifier node $P6_{id}$ is created in the first data structure 201. The identifier node $P6_{id}$ identifies the content of each matched memory page (e.g., the first matched memory page p6) in the third data structure 301. In an example embodiment, the third data structure 301 is a list. The first matched memory page p6 is attached to the identifier node $P6_{id}$. However, because additional matched memory pages are subsequently created and attached, the first matched memory page p6 becomes the first matched memory page $p6_0$. Likewise, node P6 becomes node $P6_0$. A second matched memory page $p6_1$ is attached to the first matched memory page $p6_0$. Likewise, node $P6_1$ for the second matched memory page $p6_1$ is created and attached to node $P6_0$. The second matched memory page $p6_1$ has the same content as the first matched memory page $p6_0$. The difference between these two matched memory pages is that the first matched memory page $p6_0$ has a plurality of memory page mappings (e.g., a quantity of memory page mappings meeting the threshold); whereas the second matched memory page $p6_1$ initially has no memory page mappings.

However, once the second matched memory page $p6_1$ is attached to the first matched memory page $p6_0$, a second mapping is added to the second matched memory page $p6_1$. This second mapping identifies the second single memory page 210. Likewise, a third mapping is added to the second matched memory page $p6_1$. This third mapping identifies the third single memory page 310. Thus, this second matched memory page $p6_1$ has in total two mappings for the two single pages (e.g., the second single memory page 210 and the third single memory page 310) that previously could not be mapped to the first matched memory page $p6_0$.

In an example embodiment, when each of the second mapping and the third mapping (discussed above) are added, they are physically added to mappings 189. For example, prior to adding the second mapping and the third mapping, the second mapping and the third mapping did not exist in mappings 189. In an alternate example embodiment, the second matched memory page $p6_1$ is not newly allocated, such that content may be copied from any of the second single memory page 210, the third single memory pages 310, or both. For example, each of the second mapping and the third mapping already exist on the respective single memory page (e.g., the second mapping exists on the second single memory page 210). In an example embodiment, no data copying is required. In this example embodiment, adding may include marking a mapping (e.g., the second mapping) and/or a memory page (e.g., the second single memory page 210) as read-only. For example, adding is not limited to physically adding a mapping; rather, adding may involve changes to pre-existing information about the mapping (e.g., marking a mapping as read only). In a related example embodiment, adding may include both physically adding a mapping (e.g., adding the second mapping to mappings 189) and changing pre-existing information about the mapping (e.g., marking the second mapping as read only).

Figure 4:
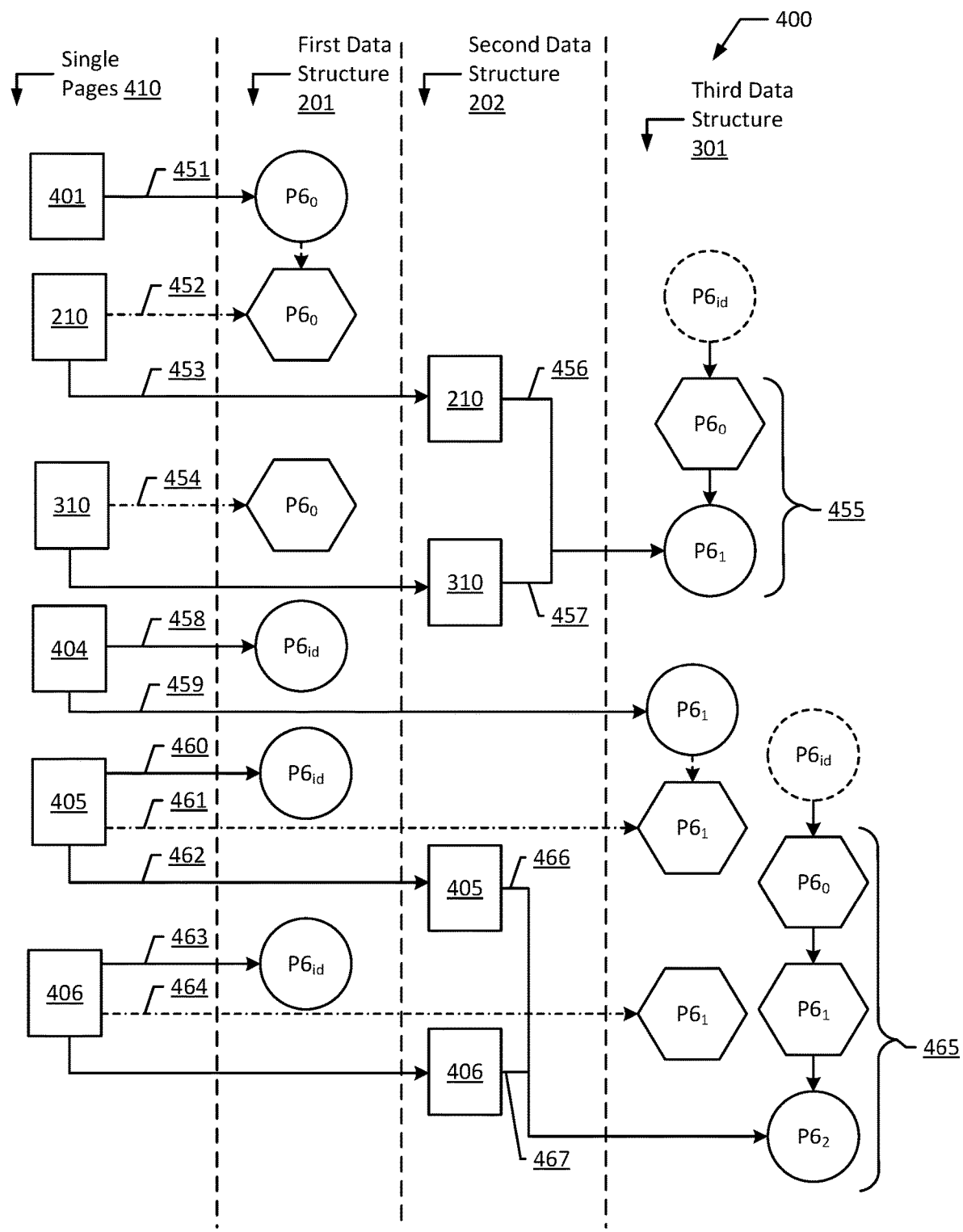
FIG. 4 is a flow diagram illustrating memory de-duplication with a first data structure, a second data structure, and a third data structure according to an example embodiment of the present disclosure.

FIG. 4 is a flow diagram illustrating memory de-duplication with a first data structure, a second data structure, and a third data structure according to an example embodiment of the present disclosure. In an example embodiment, de-duplication involves the storage, movement, and mapping of a plurality of single pages 410 (e.g., a first single memory page 401, a second single memory page 210, a third single memory page 310, a fourth single memory page 404, a fifth single memory page 405, a sixth single memory page 406, etc.) among a number of data structures including a first data structure 201, a second data structure 202, and a third data structure 301.

In an example embodiment, de-duplication 400 starts with receiving a first single memory page 401. A plurality of candidate memory pages of a first data structure 201 is scanned, including at least a first node and a second node. Each of the first node and the second node point to a first candidate memory page and a second candidate memory page respectively. De-duplication 400 further includes identifying a first matched memory page $p6_0$ as a match to the first single memory page 401. The first matched memory page $p6_0$ is one of the plurality of candidate memory pages that matches the first single memory page 401. De-duplication 400 further includes determining that a quantity of memory page mappings to the first matched memory page $p6_0$ is less than a threshold (e.g., the first matched memory page $p6_0$ is graphically represented as a circle when it is not yet full of memory page mappings). For example, the quantity of memory page mappings to the first matched memory page $p6_0$ is 199 mappings, and the threshold is 200 mappings. Responsive to determining that the quantity of memory page mappings to the first matched memory page $p6_0$ is less than the threshold, de-duplication 400 further includes adding a first mapping (block 451) to the first matched memory page $p6_0$, the first mapping identifying the first single memory page 401. For example, now, the quantity of memory page mappings to the first matched memory page $p6_0$ is 200 mappings.

De-duplication 400 further includes receiving a second single memory page 210. The plurality of candidate memory pages of the first data structure 201 is scanned. De-duplication 400 further includes identifying the first matched memory page $p6_0$ as a match to the second single memory page 210. De-duplication 400 further includes determining that the quantity of memory page mappings to the first matched memory page $p6_0$ meets the threshold (block 452) (e.g., the node $P6_0$ for the first matched memory page $p6_0$ is graphically represented as a hexagon when it is full of memory page mappings). For example, the quantity of memory page mappings to the first matched memory page $p6_0$ is 200 mappings. Responsive to determining that the quantity of memory page mappings to the first matched memory page $p6_0$ meets the threshold, de-duplication 400 further includes scanning a second data structure 202 for the match to the second single memory page 210. De-duplication 400 further includes determining that the second data structure 202 lacks the match to the second single memory page 210. De-duplication 400 further includes, responsive to determining that the second data structure 202 lacks the match to the second single memory page 210, storing the second single memory page 210 in the second data structure 202 (block 453).

De-duplication 400 further includes receiving a third single memory page 310. The plurality of candidate memory pages of the first data structure 201 is scanned. De-duplication 400 further includes identifying the first matched memory page $p6_0$ as a match to the third single memory page 310. De-duplication 400 further includes determining that the quantity of memory page mappings to the first matched memory page $p6_0$ meets the threshold (block 454). For example, the quantity of memory page mappings to the first matched memory page $p6_0$ is 200 mappings. Responsive to determining that the quantity of memory page mappings to the first matched memory page $p6_0$ meets the threshold, de-duplication 400 further includes scanning the second data structure 202 for the match to the third single memory page 310. De-duplication 400 further includes identifying the second single memory page 210 as the match to the third single memory page 310. De-duplication 400 further includes, responsive to identifying the second single memory page 210 as the match to the third single memory page 310, creating a third data structure 301 that replaces the first matched memory page $p6_0$ (block 455).

In an example embodiment, creating the third data structure 301 includes creating an identifier node $P6_{id}$ in the first data structure 201, the identifier node $P6_{id}$ identifying content of each matched memory page in the third data structure 301. As illustrated, the identifier node $P6_{id}$ is shown in hashed lines, because it actually exists on the first data structure 201; however, it is attached to the rest of the third data structure 301 as described below. Creating the third data structure 301 further includes attaching the first matched memory page $p6_0$ to the identifier node $P6_{id}$. Creating the third data structure 301 further includes attaching a second matched memory page $p6_1$ to the first matched memory page $p6_0$, including adding a second mapping to the second matched memory page $p6_1$ (block 456), the second mapping identifying the second single memory page 210, and adding a third mapping to the second matched memory page $p6_1$ (block 457), the third mapping identifying the third single memory page 310.

De-duplication 400 further includes receiving a fourth single memory page 404. The plurality of candidate memory pages of the first data structure 201 is scanned. In an example embodiment, scanning the plurality of candidate memory pages of the first data structure 201 includes scanning one candidate memory page of the third data structure 301 associated with each identifier node (e.g., for identifier node $P6_{id}$, one of the candidate memory pages, including the first matched memory page $p6_0$ and the second matched memory page $p6_1$, is scanned). In an alternate example embodiment, scanning the plurality of candidate memory pages of the first data structure includes scanning the entire third data structure 301 associated with each identifier node (e.g., for identifier node $P6_{id}$, all of the candidate memory pages, including the first matched memory page $p6_0$ and the second matched memory page $p6_1$, are scanned).

De-duplication 400 further includes identifying the identifier node $P6_{id}$ as a match to the fourth single memory page 404 (block 458) (e.g., identifying one candidate memory page of the third data structure 301 associated with the identifier node). De-duplication 400 further includes determining that the quantity of memory page mappings to the first matched memory page $p6_0$ meets the threshold. For example, the quantity of memory page mappings to the first matched memory page $p6_0$ is 200 mappings. De-duplication 400 further includes determining that a quantity of memory page mappings to the second matched memory page $p6_1$ is less than the threshold. For example, the quantity of memory page mappings to the second matched memory page $p6_1$ is two mappings (e.g., mappings for the second single page 210 and the third single page 310), which is less than a 200 mapping threshold. Responsive to determining that the quantity of memory page mappings to the second matched memory page $p6_1$ is less than the threshold, de-duplication 400 further includes adding a fourth mapping (block 459) to the second matched memory page $p6_1$, the fourth mapping identifying the fourth single memory page 404.

In an example embodiment, the first matched memory page $p6_0$ and the second matched memory page $p6_1$ are re-organized within the third data structure 301. More particularly, responsive to adding the fourth mapping to the second matched memory page $p6_1$, it is determined that the quantity of memory page mappings to the second matched memory page $p6_1$ is less than the threshold (e.g., the quantity of memory page mappings to the second matched memory page $p6_0$ is now one mapping). Responsive to determining that the quantity of memory page mappings to the second matched memory page $p6_1$ is less than the threshold, the third data structure 301 is reordered. Reordering includes attaching the second matched memory page $p6_1$ to the identifier node $P6_{id}$. Reordering additionally includes attaching the first matched memory page $p6_0$ to the second matched memory page $p6_1$, such that the second matched memory page $p6_1$ is at the beginning of the third data structure 301. Accordingly, a matched memory page that is not yet at the threshold (e.g., the second matched memory page $p6_1$) may be scanned before a matched memory page that is at the threshold (e.g., the first matched memory page $p6_0$) when scanning is performed in a linear-chained fashion (e.g., scanning the identifier node $P6_{id}$, then scanning the second matched memory page $p6_1$, then scanning the first matched memory page $p6_0$), thus improving scan times of the third data structure 301.

In a related example embodiment, the quantity of memory page mappings to the second matched memory page $p6_1$ is less than the threshold, and the quantity of memory page mappings to the second matched memory page $p6_1$ is greater than the quantity of memory page mappings to the first matched memory page $p6_0$ and a plurality of other matched memory pages in the third data structure 301. In this example embodiment, the quantity of memory page mappings to first matched memory page $p6_0$ and the second matched memory page $p6_1$ (and a plurality of other matched memory pages) are all individually less than the threshold; however, the second matched memory page $p6_1$ has the most memory page mappings, when compared to the first matched memory page $p6_0$ and the plurality of other matched memory pages (e.g. the second matched memory page $p6_1$ has the highest quantity of memory page mappings, without actually meeting the threshold).

In an example embodiment, at least one of the candidate memory pages (e.g., the first matched memory page $p6_0$) may be migrated. Migration of the first matched memory page $p6_0$ includes moving the first matched memory page $p6_0$ from a first location (e.g., a first location in host memory 184) to a second location (e.g., a second location in host memory 184). Additionally, migration of the first matched memory page $p6_0$ includes updating a plurality of mappings to the first matched memory page $p6_0$. The plurality of mappings that are updated includes, for example, the first mapping (e.g., the mapping associated with the first single page 401) and a plurality of additional mappings, such that the plurality of mappings identify the second location. In an example embodiment, maps to various memory locations are updated in mappings 189. In an example embodiment, this migration, and subsequent updating of mappings 189, is performed by the hypervisor 180. In alternate example embodiments, migration and updating of mappings 189 is performed by the host OS 186 and/or the guest OS 196A-B.

De-duplication 400 further includes receiving a fifth single memory page 405. De-duplication 400 further includes identifying the identifier node $P6_{id}$ as a match to the fifth single memory page 405 (block 460). De-duplication 400 further includes determining that the quantity of memory page mappings to the first matched memory page $p6_0$ meets the threshold. For example, the quantity of memory page mappings to the first matched memory page $p6_0$ is 200 mappings. De-duplication 400 further includes determining that the quantity of memory page mappings to the second matched memory page $p6_1$ meets the threshold (block 461). For example, the quantity of memory page mappings to the second matched memory page $p6_1$ is 200 mappings. Responsive to determining that the quantity of memory page mappings to the second matched memory page $p6_1$ meets the threshold, de-duplication 400 further includes scanning the second data structure 202 for the match to the fifth single memory page 405. De-duplication 400 further includes determining that the second data structure 202 lacks the match to the fifth single memory page 405. De-duplication 400 further includes, responsive to determining that the second data structure 202 lacks the match to the fifth single memory page 405, storing the fifth single memory page 405 in the second data structure 202 (block 462).

De-duplication 400 further includes receiving a sixth single memory page 406. The plurality of candidate memory pages of the first data structure 201 is scanned. De-duplication 400 further includes identifying the identifier node $P6_{id}$ as a match to the sixth single memory page 406 (block 463). De-duplication 400 further includes determining that the quantity of memory page mappings to the first matched memory page $p6_0$ meets the threshold. For example, the quantity of memory page mappings to the first matched memory page $p6_0$ is 200 mappings. De-duplication 400 further includes determining that the quantity of memory page mappings to the second matched memory page $p6_1$ meets the threshold (block 464). For example, the quantity of memory page mappings to the second matched memory page $p6_1$ is 200 mappings. Responsive to determining that the quantity of memory page mappings to the first matched memory page $p6_0$ and the second matched memory page $p6_1$ meet the threshold, de-duplication 400 further includes scanning the second data structure 202 for the match to the sixth single memory page 406. De-duplication 400 further includes identifying the fifth single memory page 405 as the match to the sixth single memory page 406. De-duplication 400 further includes, responsive to identifying the fifth single memory page 405 as the match to the sixth single memory page 406, attaching a third matched memory page $p6_2$ to the second matched memory page $p6_1$ (block 465), including adding a fifth mapping to the third matched memory page $p6_2$ (block 466), the fifth mapping identifying the fifth single memory page 405, and adding a sixth mapping to the third matched memory page $p6_2$ (block 467), the sixth mapping identifying the sixth single memory page 406.

In an example embodiment, de-duplication 400 may further include interaction with single memory pages that do not match candidate memory pages. For example, a seventh single memory page may be received. The plurality of candidate memory pages of the first data structure 201 is scanned; however, it is determined that the plurality of candidate memory pages lacks a match to the seventh single memory page (e.g., the seventh single memory page has different content from each of the plurality of candidate memory pages). Responsive to determining that the first data structure 201 lacks the match to the seventh single memory page, the seventh single memory page may be stored in the second data structure 202.

Figure 5A:
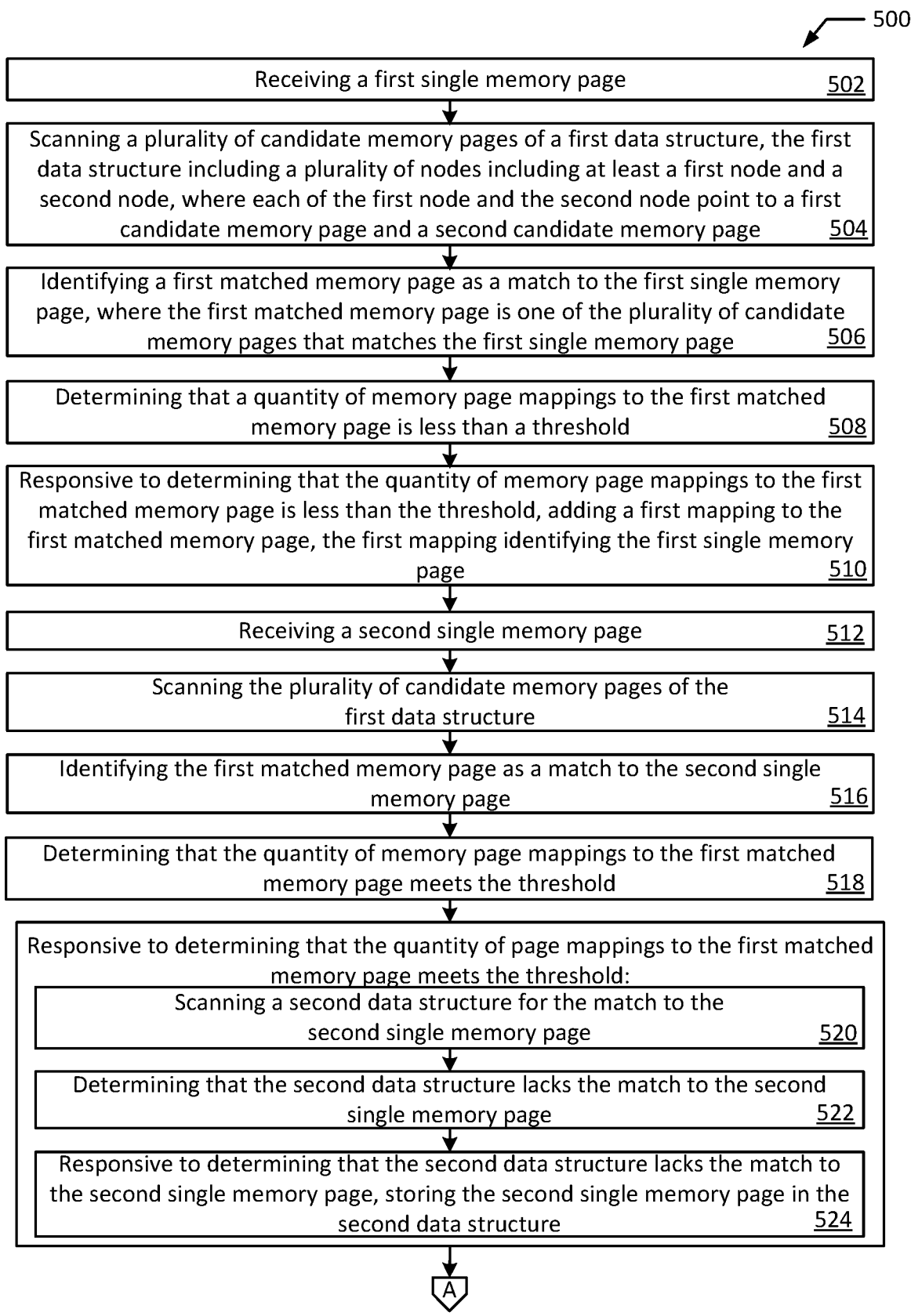
FIGS. 5A-B are a flowchart illustrating an example method of memory de-duplication according to an example embodiment of the present disclosure.
Figure 5B:
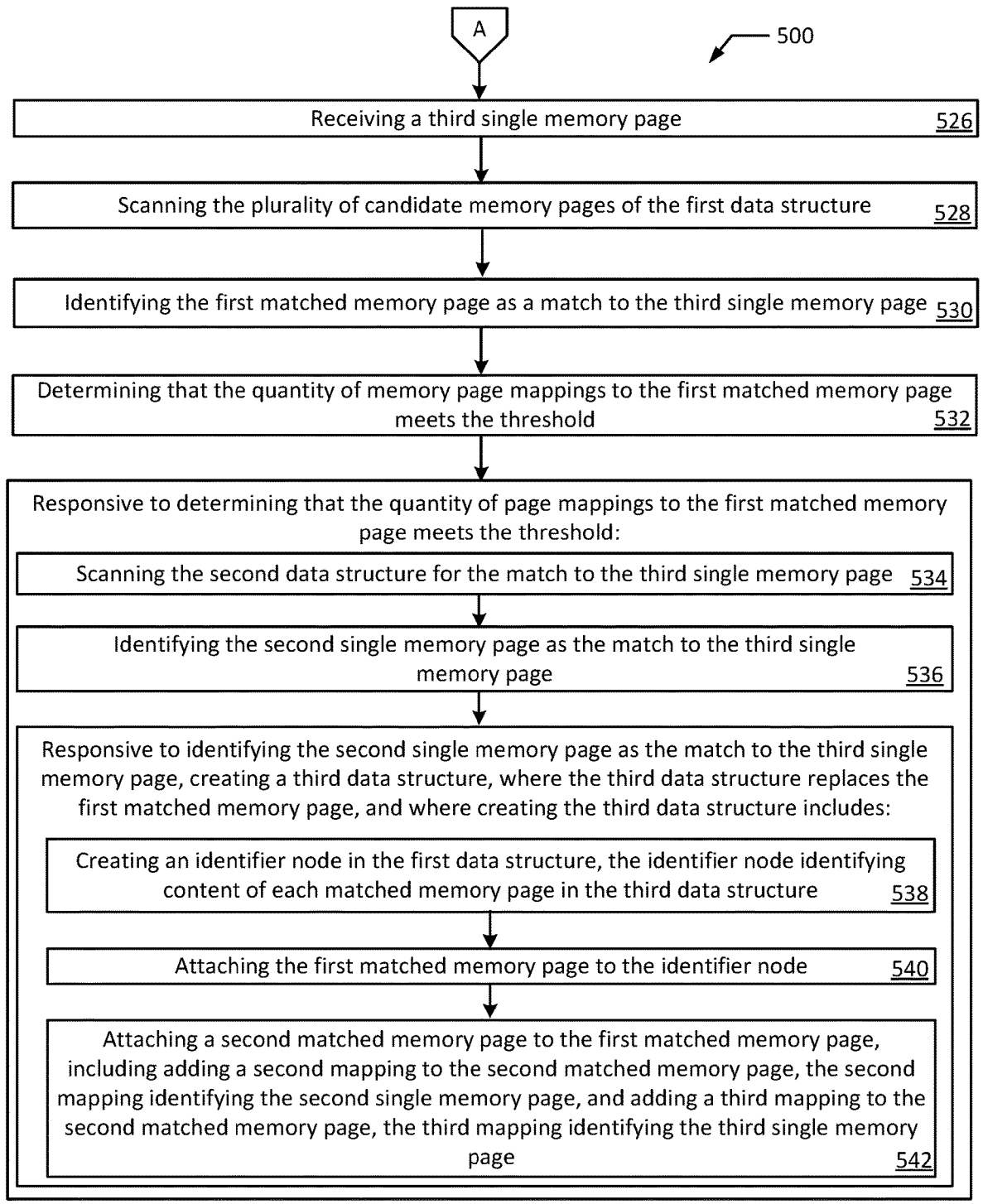

FIGS. 5A-B are a flowchart illustrating an example method of memory de-duplication according to an example embodiment of the present disclosure. Although the example method 500 is described with reference to the flowchart illustrated in FIGS. 5A-B, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may include hardware (circuitry, dedicated logic, etc.), software, or a combination of both. In an example embodiment, the method is performed by a hypervisor 180 and a guest virtual machine (e.g., 170A). In other example embodiments, the method is performed by other memory systems (e.g., computer system 100, an external computer system, etc.)

The example method 500 starts with receiving a first single memory page 401 (block 502). The example method 500 continues by scanning a plurality of candidate memory pages of a first data structure 201 (block 504). In an example embodiment, the first data structure 201 includes a plurality of nodes including at least a first node and a second node. Each of the first node and the second node point to a first candidate memory page and a second candidate memory page respectively. The method 500 further includes identifying a first matched memory page $p6_0$ as a match to the first single memory page 401 (block 506). The first matched memory page $p6_0$ is one of the plurality of candidate memory pages that matches the first single memory page 401. The method 500 further includes determining that a quantity of memory page mappings to the first matched memory page $p6_0$ is less than a threshold (block 508). Responsive to determining that the quantity of memory page mappings to the first matched memory page $p6_0$ is less than the threshold, the method 500 further includes adding a first mapping to the first matched memory page $p6_0$, the first mapping identifying the first single memory page 401 (block 510).

The method 500 further includes receiving a second single memory page 210 (block 512). The method 500 further includes scanning the plurality of candidate memory pages of the first data structure 201 (block 514). The method 500 further includes identifying the first matched memory page $p6_0$ as a match to the second single memory page 210 (block 516). The method 500 further includes determining that the quantity of memory page mappings to the first matched memory page $p6_0$ meets the threshold (block 518). The method 500 further includes, responsive to determining that the quantity of memory page mappings to the first matched memory page $p6_0$ meets the threshold, scanning a second data structure 202 for the match to the second single memory page 210 (block 520). The method 500 further includes determining that the second data structure 202 lacks the match to the second single memory page 210 (block 522). The method 500 further includes, responsive to determining that the second data structure 202 lacks the match to the second single memory page 210, storing the second single memory page 210 in the second data structure 202 (block 524).

The method 500 further includes receiving a third single memory page 310 (block 526). The method 500 further includes scanning the plurality of candidate memory pages of the first data structure 201 (block 528). The method 500 further includes identifying the first matched memory page $p6_0$ as a match to the third single memory page 310 (block 530). The method 500 further includes determining that the quantity of memory page mappings to the first matched memory page $p6_0$ meets the threshold (block 532). The method 500 further includes, responsive to determining that the quantity of memory page mappings to the first matched memory page $p6_0$ meets the threshold, scanning the second data structure 202 for the match to the third single memory page 310 (block 534). The method 500 further includes identifying the second single memory page 210 as the match to the third single memory page 310 (block 536). The method 500 further includes, responsive to identifying the second single memory page 210 as the match to the third single memory page 310, creating a third data structure 301 that replaces the first matched memory page $p6_0$, where creating the third data structure 301 includes creating an identifier node $P6_{id}$ in the first data structure 201, the identifier node $P6_{id}$ identifying content of each matched memory page in the third data structure 301 (block 538). Creating the third data structure 301 further includes attaching the first matched memory page $p6_0$ to the identifier node $P6_{id}$ (block 540). Creating the third data structure 301 further includes attaching a second matched memory page $p6_1$ to the first matched memory page $p6_0$, including adding a second mapping to the second matched memory page $p6_1$, the second mapping identifying the second single memory page 210, and adding a third mapping to the second matched memory page $p6_1$, the third mapping identifying the third single memory page 310.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of memory de-duplication, the method comprising:
   receiving a first single memory page;
   scanning a plurality of candidate memory pages of a first data structure, wherein the first data structure includes a plurality of nodes including at least a first node and a second node, wherein each of the first node and the second node point to a first candidate memory page and a second candidate memory page respectively, and wherein the first node further includes at least one sub-node that points to the first candidate memory page;
   identifying a first matched memory page as a match to the first single memory page, wherein the first matched memory page is one of the plurality of candidate memory pages that matches the first single memory page;
   determining that a quantity of memory page mappings to the first matched memory page is less than a threshold, wherein the quantity of memory page mappings to the first matched memory page is a quantity of duplicate memory pages that are mapped to the first matched memory page, and wherein the threshold is a predefined quantity of internal references to a respective memory page; and
   responsive to determining that the quantity of memory page mappings to the first matched memory page is less than the threshold, adding a first mapping to the first matched memory page, the first mapping identifying the first single memory page.

2. The method of claim 1, further comprising:
   receiving a second single memory page; scanning the plurality of candidate memory pages of the first data structure;
   identifying the first matched memory page as a match to the second single memory page;
   determining that the quantity of memory page mappings to the first matched memory page meets the threshold; and
   responsive to determining that the quantity of memory page mappings to the first matched memory page meets the threshold;
   scanning a second data structure for the match to the second single memory page;
   determining that the second data structure lacks the match to the second single memory page; and responsive to determining that the second data structure lacks the match to the second single memory page, storing the second single memory page in the second data structure.

3. The method of claim 2, further comprising:
receiving a third single memory page;
scanning the plurality of candidate memory pages of the first data structure;
identifying the first matched memory page as a match to the third single memory page;
determining that the quantity of memory page mappings to the first matched memory page meets the threshold; and
responsive to determining that the quantity of memory page mappings to the first matched memory page meets the threshold;
scanning the second data structure for the match to the third single memory page;
identifying the second single memory page as the match to the third single memory page; and
responsive to identifying the second single memory page as the match to the third single memory page, creating a third data structure, wherein the third data structure replaces the first matched memory page, and wherein creating the third data structure includes:
creating an identifier node in the first data structure, the identifier node identifying content of each matched memory page in the third data structure;
attaching the first matched memory page to the identifier node; and
attaching a second matched memory page to the first matched memory page, including:
adding a second mapping to the second matched memory page, the second mapping identifying the second single memory page, and
adding a third mapping to the second matched memory page, the third mapping identifying the third single memory page.

4. The method of claim 3, further comprising:
receiving a fourth single memory page; scanning the plurality of candidate memory pages of the first data structure;
identifying the identifier node as a match to the fourth single memory page;
determining that the quantity of memory page mappings to the first matched memory page meets the threshold;
determining that a quantity of memory page mappings to the second matched memory page is less than the threshold; and
responsive to determining that the quantity of memory page mappings to the second matched memory page is less than the threshold, adding a fourth mapping to the second matched memory page, the fourth mapping identifying the fourth single memory page.

5. The method of claim 4, further comprising:
receiving a fifth single memory page; scanning the plurality of candidate memory pages of the first data structure;
identifying the identifier node as a match to the fifth single memory page;
determining that the quantity of memory page mappings to the first matched memory page meets the threshold;
determining that the quantity of memory page mappings to the second matched memory page meets the threshold; and
responsive to determining that the quantity of memory page mappings to the second matched memory page meets the threshold:
scanning the second data structure for the match to the fifth single memory page;
determining that the second data structure lacks the match to the fifth single memory page; and
responsive to determining that the second data structure lacks the match to the fifth single memory page, storing the fifth single memory page in the second data structure.

6. The method of claim 5, further comprising receiving a sixth single memory page;
scanning the plurality of candidate memory pages of the first data structure; identifying the identifier node as a match to the sixth single memory page;
determining that the quantity of memory page mappings to the first matched memory page meets the threshold;
determining that the quantity of memory page mappings to the second matched memory page meets the threshold; and
responsive to determining that the quantity of memory page mappings to the first matched memory page and the quantity of memory page mappings to the second matched memory page both meet the threshold:
scanning the second data structure for the match to the sixth single memory page;
identifying the fifth single memory page as the match to the sixth single memory page;
responsive to identifying the fifth single memory page as the match to the sixth single memory page, attaching a third matched memory page to the second matched memory page, including:
adding a fifth mapping to the third matched memory page, the fifth mapping identifying the fifth single memory page, and adding a sixth mapping to the third matched memory page, the sixth mapping identifying the sixth single memory page.

7. The method of claim 3, further comprising migration of the first matched memory page, including:
moving the first matched memory page from a first location to a second location; and
updating a plurality mappings to the first matched memory page, including the first mapping and a plurality of additional mappings, such that the plurality of mappings identify the second location.

8. The method of claim 4, wherein scanning the plurality of candidate memory pages of the first data structure includes scanning one candidate memory page of the third data structure associated with each identifier node.

9. The method of claim 4, wherein scanning the plurality of candidate memory pages of the first data structure includes scanning the entire third data structure associated with each identifier node, including the first matched memory page and the second matched memory page.

10. The method of claim 4, further comprising, responsive to adding the fourth mapping to the second matched memory page:
determining that the quantity of memory page mappings to the second matched memory page is less than the threshold; and
responsive to determining that the quantity of memory page mappings to the second matched memory page is less than the threshold, reordering the third data structure, wherein reordering the third data structure includes:

attaching the second matched memory page to the identifier node, and attaching the first matched memory page to the second matched memory page, such that the second matched memory page is at the beginning of the third data structure.

11. The method of claim 10, wherein, responsive to updating mappings to the first matched memory page and the second matched memory page, the quantity of memory page mappings to the second matched memory page is less than the threshold and the quantity of memory page mappings to the first matched memory page.

12. The method of claim 1, further comprising receiving a seventh single memory page; scanning the plurality of candidate memory pages of the first data structure;
determining that the plurality of candidate memory pages lacks a match to the seventh single memory page and that the seventh single memory page has different content from each of the plurality of candidate memory pages; and
responsive to determining that the first data structure lacks the match to the seventh single memory page, storing the seventh single memory page in the second data structure.

13. The method of claim 1, wherein the threshold is a fixed number of internal references that is changeable at runtime.

14. The method of claim 1, wherein the first matched memory page is a read-only memory page.

15. A system for memory de-duplication, the system comprising:
a memory;
one or more processors, in communication with the memory;
a first data structure, in communication with the one or more processors;
a second data structure, in communication with the one or more processors; and
a third data structure, in communication with the one or more processors;
wherein the one or more processors are configured to:
receive a first single memory page;
scan a plurality of candidate memory pages of the first data structure, wherein the first data structure includes a plurality of nodes including at least a first node and a second node, wherein each of the first node and the second node point to a first candidate memory page and a second candidate memory page respectively, and wherein the first node further includes at least one sub-node that points to the first candidate memory page;
identify a first matched memory page as a match to the first single memory page, wherein the first matched memory page is one of the plurality of candidate memory pages that matches the first single memory page;
determine that a quantity of memory page mappings to the first matched memory page is less than a threshold, wherein the quantity of memory page mappings to the first matched memory page is a quantity of duplicate memory pages that are mapped to the first matched memory page, and wherein the threshold is a predefined quantity of internal references to a respective memory page;
responsive to determining that the quantity of memory page mappings to the first matched memory page is less than the threshold, add a first mapping to the first matched memory page, the first mapping identifying the first single memory page; receive a second single memory page;
scan the plurality of candidate memory pages of the first data structure;
identify the first matched memory page as a match to the second single memory page;
determine that the quantity of memory page mappings to the first matched memory page meets the threshold; and
responsive to determining that the quantity of memory page mappings to the first matched memory page meets the threshold:
scan the second data structure for the match to the second single memory page;
determine that the second data structure lacks the match to the second single memory page; and
responsive to determining that the second data structure lacks the match to the second single memory page, store the second single memory page in the second data structure.

16. The system of claim 15, wherein the one or more processors are further configured to: receive a third single memory page; scan the plurality of candidate memory pages of the first data structure; identify the first matched memory page as a match to the third single memory page; determine that the quantity of memory page mappings to the first matched memory page meets the threshold; and responsive to determining that the quantity of memory page mappings to the first matched memory page meets the threshold: scan the second data structure for the match to the third single memory page;
identify the second single memory page as the match to the third single memory page; and responsive to identifying the second single memory page as the match to the third single memory page, create the third data structure, wherein the third data structure replaces the first matched memory page, and wherein creating the third data structure includes: creating an identifier node in the first data structure, the identifier node identifying content of each matched memory page in the third data structure; attaching the first matched memory page to the identifier node; and attaching a second matched memory page to the first matched memory page, including: adding a second mapping to the second matched memory page, the second mapping identifying the second single memory page, and adding a third mapping to the second matched memory page, the third mapping identifying the third single memory page.

17. The system of claim 15, wherein the first data structure is a red black tree.

18. The system of claim 15, wherein the second data structure is a red black tree.

19. The system of claim 15, wherein the third data structure is a list.

20. A computer readable non-transitory storage medium comprising executable instructions that, when executed, are configured to cause a processor to:
receive a first single memory page;
scan a plurality of candidate memory pages of the first data structure, wherein the first data structure includes a plurality of nodes including at least a first node and a second node, wherein each of the first node and the second node point to a first candidate memory page and a second candidate memory page respectively, and wherein the first node further includes at least one sub-node that points to the first candidate memory page;

identify a first matched memory page as a match to the first single memory page, wherein the first matched memory page is one of the plurality of candidate memory pages that matches the first single memory page;

determine that a quantity of memory page mappings to the first matched memory page is less than a threshold, wherein the quantity of memory page mappings to the first matched memory page is a quantity of duplicate memory pages that are mapped to the first matched memory page, and wherein the threshold is a predefined quantity of internal references to a respective memory page;

responsive to determining that the quantity of memory page mappings to the first matched memory page is less than the threshold, add a first mapping to the first matched memory page, the first mapping identifying the first single memory page;

receive a second single memory page;

scan the plurality of candidate memory pages of the first data structure;

identify the first matched memory page as a match to the second single memory page;

determine that the quantity of memory page mappings to the first matched memory page meets the threshold, wherein the threshold is a predefined quantity of internal references to a respective memory page; and responsive to determining that the quantity of memory page mappings to the first matched memory page meets the threshold:

scan the second data structure for the match to the second single memory page;

determine that the second data structure lacks the match to the second single memory page;

responsive to determining that the second data structure lacks the match to the second single memory page, store the second single memory page in the second data structure;

receive a third single memory page;

scan the plurality of candidate memory pages of the first data structure;

identify the first matched memory page as a match to the third single memory page;

determine that the quantity of memory page mappings to the first matched memory page meets the threshold; and responsive to determining that the quantity of memory page mappings to the first matched memory page meets the threshold:

scan the second data structure for the match to the third single memory page;

identify the second single memory page as the match to the third single memory page; and responsive to identifying the second single memory page as the match to the third single memory page, create the third data structure, wherein the third data structure replaces the first matched memory page, and wherein creating the third data structure includes:

creating an identifier node in the first data structure, the identifier node identifying content of each matched memory page in the third data structure;

attaching the first matched memory page to the identifier node; and attaching a second matched memory page to the first matched memory page, including:

adding a second mapping to the second matched memory page, the second mapping identifying the second single memory page, and adding a third mapping to the second matched memory page, the third mapping identifying the third single memory page.

* * * * *